(12) United States Patent
Chopra et al.

(10) Patent No.: US 11,263,480 B2
(45) Date of Patent: Mar. 1, 2022

(54) MACHINE LEARNING MODEL DEVELOPMENT WITH INTERACTIVE MODEL EVALUATION

(71) Applicant: The Boeing Company, Chicago, IL (US)

(72) Inventors: Seema Chopra, Bengaluru (IN); Akshata Kishore Moharir, Bengaluru (IN); Arvind Sundararaman, Bengaluru (IN); Kaustubh Kaluskar, Bangalore (IN)

(73) Assignee: The Boeing Company, Chicago, IL (US)

( * ) Notice: Subject to any disclaimer, the term of this patent is extended or adjusted under 35 U.S.C. 154(b) by 794 days.

(21) Appl. No.: 16/170,897

(22) Filed: Oct. 25, 2018

(65) Prior Publication Data

US 2020/0134370 A1 Apr. 30, 2020

(51) Int. Cl.
*G06K 9/62* (2006.01)
*G06N 20/00* (2019.01)
*G01C 23/00* (2006.01)

(52) U.S. Cl.
CPC ......... *G06K 9/6254* (2013.01); *G01C 23/005* (2013.01); *G06K 9/6232* (2013.01); *G06K 9/6263* (2013.01); *G06N 20/00* (2019.01)

(58) Field of Classification Search
CPC ..... G06K 9/6254; G06K 9/6232; G06N 20/00
USPC ........................................................ 706/12
See application file for complete search history.

(56) References Cited

U.S. PATENT DOCUMENTS

| 6,526,168 | B1 | 2/2003 | Ornes et al. |
| 2015/0379429 | A1* | 12/2015 | Lee .................. G06N 20/00 706/11 |
| 2016/0358099 | A1 | 12/2016 | Sturlaugson et al. |
| 2017/0233105 | A1 | 8/2017 | Vali et al. |

OTHER PUBLICATIONS

Wikipedia, "Exploratory data analysis", Retrieved from https://en.wikipedia.org/wiki/Exploratory_data_analysis on Jul. 26, 2018, 7pgs.

(Continued)

*Primary Examiner* — Jeffery A Williams
(74) *Attorney, Agent, or Firm* — Womble Bond Dickinson (US) LLP

(57) ABSTRACT

A method is provided that includes generating a visual environment for interactive development of a machine learning (ML) model. The method includes accessing observations of data each of which includes values of independent variables and a dependent variable, and performing an interactive exploratory data analysis (EDA) of the values of a set of the independent variables. The method includes performing an interactive feature construction and selection based on the interactive EDA, and in which select independent variables are selected as or transformed into a set of features for use in building a ML model to predict the dependent variable. The method includes building the ML model using a ML algorithm, the set of features, and a training set produced from the set of features and observations of the data. And the method includes outputting the ML model for deployment to predict the dependent variable for additional observations of the data.

27 Claims, 9 Drawing Sheets

(56) References Cited

OTHER PUBLICATIONS

Wikipedia, "Feature selection", Retrieved from https://en.wikipedia.org/wiki/Feature_selection on Jul. 26, 2018, 11 pgs.
Wikipedia, "Machine learning", Retrieved from https://en.wikipedia.org/wiki/Machine_learning on Jul. 26, 2018, 15pgs.
Smilkov et al., "Direct-Manipulation Visualization of Deep Networks," Arvix.org, Cornell University Library, Aug. 12, 2017, 5 pages.
Extended European Search Report from European Patent Appl. No. 19202403.2, dated Mar. 20, 2020.

\* cited by examiner

MACHINE LEARNING MODEL DEVELOPMENT WITH INTERACTIVE MODEL EVALUATION

TECHNOLOGICAL FIELD

The present disclosure relates generally to machine learning and, in particular, to interactive development of a machine learning model.

BACKGROUND

Machine learning (ML) is a process to analyze data in which the dataset is used to determine a ML model (also called a rule or a function) that maps input data (also called explanatory variables or predictors) to output data (also called dependent variables or response variables) according to a machine learning algorithm. A broad array of machine learning algorithms are available, with new algorithms the subject of active research. One type of machine learning is supervised learning in which a model is trained with a dataset including known output data for a sufficient number of input data. Once a model is trained, it may be deployed, i.e., applied to new input data to predict the expected output.

Machine learning may be applied to a number of different types of problems such as regression problems and classification problems. In regression problems the output data includes numeric values such as a voltage, a pressure, a number of cycles. In classification problems the output data includes labels, classes, categories (e.g., pass-fail, healthy-faulty, failure type, etc.) and the like.

Owing to the empirical nature of most ML models, their results are sometimes difficult to interpret, and considered a "black box" by many subject matter experts (SMEs) and other users. This black box nature prevents SMEs from fully understanding how the algorithms arrived at their results and therefore may reduce SMEs' and other users' confidence in using ML algorithms developed by data scientists.

Therefore it would be desirable to have a system and method that takes into account at least some of the issues discussed above, as well as other possible issues.

BRIEF SUMMARY

Example implementations of the present disclosure are directed to interactive development of a ML model that closes the loop between machine learning and human intelligence. Example implementations provides a framework that enables SMEs to look inside the ML models as they are developed and refined. The framework is dynamic and interactive, and includes an active feedback mechanism to enable SMEs to interact with the ML models in order to understand and refine them to meet their needs. This active feedback mechanism creates a real-time interactive ML model that incorporates domain knowledge (SME input) into the model's development process as the model is built. The framework enables SML input to the ML model development process, enabling development of a "white box" ML model that is at times referred to as human-centric or human-in-the-loop machine learning. ML models developed according to example implementations of the present disclosure is better understood than conventional "black box" ML models, and may be relied on with greater confidence. These models incorporation of domain knowledge also generally perform better than and are more reliable for decision-making than conventional ML models.

The present disclosure thus includes, without limitation, the following example implementations.

Some example implementations provide a method of interactive machine learning model development, the method comprising executing an application, via processing circuitry, to generate a visual environment including a graphical user interface (GUI) for interactive development of a machine learning model, according to an iterative process at least an iteration of which includes at least: accessing a plurality of observations of data of a system, each of the plurality of observations of the data including values of a plurality of independent variables, and a value of a dependent variable; building the machine learning model using a machine learning algorithm, a set of features constructed or selected from select independent variables of the plurality of independent variables, and a training set produced from the set of features and the plurality of observations of the data, including values of the select independent variables, and the value of the dependent variable; and performing an interactive model evaluation to evaluate the machine learning model, including using the machine learning model to predict and thereby produce evaluative predictions of the dependent variable, and produce at least one evaluative infographic in the GUI that summarizes the evaluative predictions in a layout that reflects performance of the machine learning model, the at least one evaluative infographic including an interactive confusion matrix in the GUI that includes a control to enable user input to increase or decrease a desired model output; and outputting the machine learning model for deployment to predict and thereby produce predictions of the dependent variable for additional observations of the data that exclude the value of the dependent variable, the predictions produced by the machine learning model being more accurate than produced by a corresponding machine learning model built without the interactive model evaluation that includes user input via the GUI.

In some example implementations of the method of any preceding example implementation, or any combination of any preceding example implementations, the system is an aircraft, and the plurality of observations of the data is flight data for plurality of flights of the aircraft, for each flight of which the values of the plurality of independent variables are measurements of a plurality of properties recorded by an airborne flight recorder from a plurality of sensors or avionic systems during the flight, and the value of the dependent variable is an indication of a condition of the aircraft during the flight.

In some example implementations of the method of any preceding example implementation, or any combination of any preceding example implementations, the iteration of the iterative process further includes performing an interactive exploratory data analysis of the values of a set of independent variables from the plurality of independent variables for a set of observations from the plurality of observations of the data, in which infographics are automatically produced in the GUI to visually summarize the values of the set of independent variables, one or more of the set of independent variables or one or more of the set of observations being selected based on user input via the GUI, and wherein building the machine learning model includes building the machine learning model using the set of features constructed or selected based on the interactive exploratory data analysis.

In some example implementations of the method of any preceding example implementation, or any combination of any preceding example implementations, at least one subsequent iteration of the iterative process includes at least performing the interactive exploratory data analysis in which the set of independent variables or the set of observations is modified based on user input via the GUI, and in which modified infographics are automatically produced in the GUI; and building a version of the machine learning model using the machine learning algorithm, a modified set of features based on the modified infographics automatically produced in the GUI, and a modified training set produced from the modified set of features and the plurality of observations of the data.

In some example implementations of the method of any preceding example implementation, or any combination of any preceding example implementations, the iteration of the iterative process further includes performing an interactive feature construction and selection in which the select independent variables from the plurality of independent variables are selected as or transformed into the set of features for use in building the machine learning model to predict the dependent variable, one or more of the select independent variables being selected as or transformed into the set of features based on user input via the GUI and the infographics automatically produced in the GUI.

In some example implementations of the method of any preceding example implementation, or any combination of any preceding example implementations, at least one subsequent iteration of the iterative process includes at least modifying one or more of the set of features to produce a modified set of features for the subsequent iteration, based on user input via the GUI; and building a version of the machine learning model using the machine learning algorithm, the modified set of features, and a modified training set produced from the modified set of features and the plurality of observations of the data.

In some example implementations of the method of any preceding example implementation, or any combination of any preceding example implementations, performing the interactive feature construction and selection includes applying the one or more of the select independent variables to a transformation to produce a feature of the set of features, the one or more of the select independent variables or the transformation being selected based on user input via the GUI.

In some example implementations of the method of any preceding example implementation, or any combination of any preceding example implementations, at least one subsequent iteration of the iterative process includes at least modifying the one or more of the select independent variables or the transformation based on user input via the GUI, and thereby modifying the feature of the set of features produced therefrom, the set of features being a modified set of features including a thereby modified feature for the subsequent iteration; and building a version of the machine learning model using the machine learning algorithm, the modified set of features, and a modified training set.

In some example implementations of the method of any preceding example implementation, or any combination of any preceding example implementations, building the machine learning model includes performing an interactive model building in which the machine learning algorithm is selected from a plurality of machine learning algorithms based on user input via the GUI, and wherein at least one subsequent iteration of the iterative process includes at least performing the interactive model building to build a version of the machine learning model using a different one of the plurality of machine learning algorithms, the set of features, and the training set, the different one of the plurality of machine learning algorithms being selected based on user input via the GUI.

Some example implementations provide an apparatus for interactive machine learning model development. The apparatus comprises a memory storing a plurality of observations of data of a system, each of the plurality of observations of the data including values of a plurality of independent variables, and a value of a dependent variable; and processing circuitry configured to access the memory, and execute an application to generate a visual environment including a graphical user interface (GUI) for interactive development of a machine learning model according to any preceding example implementation, or any combination of any preceding example implementations.

Some example implementations provide a non-transitory computer-readable storage medium for interactive machine learning model development, the computer-readable storage medium having computer-readable program code stored therein that in response to execution by processing circuitry, causes an apparatus to at least generate a visual environment including a graphical user interface (GUI) for interactive development of a machine learning model according to any preceding example implementation, or any combination of any preceding example implementations.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
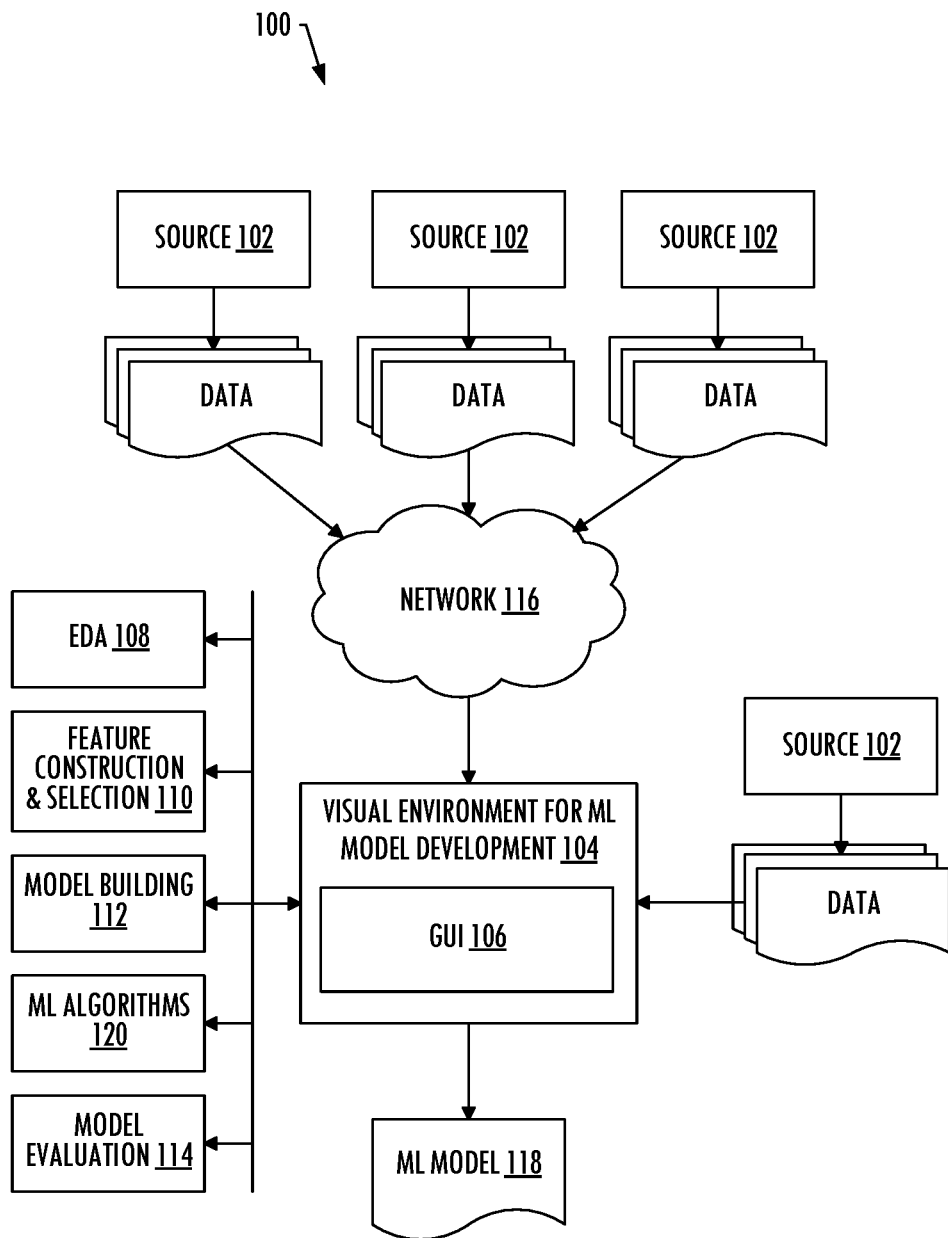
FIG. 1 illustrates a system for interactive development of a machine learning model, according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure provide a framework that incorporates human-in-the-loop (HITL) into machine learning and, in particular, to interactive development of a machine learning (ML) model. The framework provides interactive visual analytics to leverage both machine learning and subject matter expert (SME) capabilities to iteratively make accurate and reliable decisions. The ML model developed according to example implementations may be applied to a number of different types of problems. For example, the ML model may be deployed to classify aircraft or aircraft components as healthy or faulty from measurements of properties recorded by an airborne flight recorder, such as a quick access recorder (QAR) of an aircraft that receives its input (the measurements) from sensors or avionic systems onboard the aircraft.

In some examples, the framework is geared to users without machine learning expertise, focusing on domain knowledge, significantly helping SMEs correctly decide reliability of the ML model's predictions, and increasing their satisfaction by justifying the prediction with visual aids of the model's parameters. At least in the context of classifying aircraft or aircraft components, example implementations may support advance fault prediction for maintenance to schedule an inspection, obtain the necessary part and perform repair to avoid operational delays. It may therefore significantly reduce unplanned maintenance and delays due to related faults, and enhance operational efficiency.

As explained in greater detail below, the framework of example implementations bridges the gap between SMEs and machine learning based on the observation that ML models that incorporate domain knowledge generally perform better than and are more reliable for decision-making than conventional ML models. Example implementations support localized inspection at a sensor or avionic-system level to facilitate an understanding of why certain data results in a specific prediction, and enables its users to generate new features and examine their effects on predictive models. The framework is a transparent machine learning framework that clearly shows the learning process to its user, which may significantly improve the exploration of the machine learning process aided by visual inspection.

Example implementations follow an iterative, multistep process for developing a ML model, from exploratory data analysis, to feature construction and selection, model building and evaluation and refinement, in which one or more if not all of the steps are interactive. An interactive exploratory data analysis may facilitate an understanding of the data, and in particular in some examples, an understanding of in-flight time-series data from different perspectives. This may allow the user to play a key role in understanding sensors or avionic systems and a time window of observations to consider for ML models.

In machine learning, features (independent variables) are measureable properties or characteristics of what is being observed, and the selection of relevant features is often an integral part of machine learning. An interactive feature selection (referred to herein at times as an interactive feature construction and selection) according to example implementations allows the user to iteratively select or otherwise construct or generate features. This may include the user iteratively adjusting feature values, and allowing the user to generate features in different ways such as time series or aggregations, and interactively observe how the ML model responds.

An interactive model building according to example implementations of the present disclosure may allow the user to select from a number of different machine learning algorithms, and may offer algorithm-specific model visualization. This may allow the user to visually inspect the ML model to understand the algorithm used to build the ML model and then use that understanding to improve the model by incorporating the user's domain knowledge.

For evaluation of the ML model, the framework of example implementations may produce a compact and easy to understand representation of model performance, such as by using a confusion matrix. In some examples, the framework may use risk values in predictions from the ML model, which may provide the user with instant feedback. This may include calculation of an optimal misclassification cost based on the user's assignment of relative importance to false positive/negative, which may then be converted into quantitative results by the underlying machine learning algorithm.

FIG. 1 illustrates a system 100 for interactive machine learning model development, according to example implementations of the present disclosure. The system may include any of a number of different subsystems (each an individual system) for performing one or more functions or operations. As shown, in some examples, the system includes at least one source 102 of data, and a visual environment 104 for ML model development that may implement the framework of example implementations of the present disclosure. The visual environment includes a graphical user interface (GUI) 106 for interacting with an exploratory data analysis (EDA) module 108, a feature construction and selection module 110, a model building module 112 and a model evaluation module 114, with one or more of the modules being interactive through the GUI.

The subsystems including the source 102, visual environment 104, EDA module 108, feature construction and selection module 110, model building module 112 and model evaluation module 114 may be co-located or directly coupled to one another, or in some examples, various ones of the subsystems may communicate with one another across one or more computer networks 116. Further, although shown as part of the system 100, it should be understood that any one or more of the above may function or operate as a separate system without regard to any of the other subsystems. It should also be understood that the system may include one or more additional or alternative subsystems than those shown in FIG. 1.

As described herein, a source 102 is a source of data of a system such as flight data for an aircraft recorded by an airborne flight recorder (e.g., QAR) with input from sensors or avionic systems onboard the aircraft. In some examples, the source includes a memory that may be located at a single source or distributed across multiple sources. The memory may store a plurality of observations of data, each of which includes values of a plurality of independent variables, and a value of a dependent variable. The data may be stored in a number of different manners, such as in a database or flat files of any of a number of different types or formats. In some examples in which the system is an aircraft, the observations include flight data for flights of the aircraft. For each flight, the values of the independent variables are measurements of a plurality of properties recorded by the airborne flight recorder from the sensors or avionic systems during the flight, and the value of the dependent variable is an indication of a condition of the aircraft during the flight.

The visual environment 104 is configured to cooperate with at least some of the EDA module 108, feature construction and selection module 110, model building module 112 and model evaluation module 114 to implement the framework of example implementations of the present disclosure to develop a ML model 118 according to an iterative process. In an iteration of the iterative process, the visual environment is configured to access the memory including the plurality of observations of the data each of which includes values of a plurality of independent variables, and a value of a dependent variable. The visual environment is also configured to cooperate with at least some of the EDA module, feature construction and selection module, model building module and model evaluation module to develop the ML model according to an iterative process. The ML model may be developed with a set of the independent variables for a set of the observations. These set of independent variables may include all or less than all of the independent variables in memory. Likewise, the set of observations may include all or less than all of the plurality of observations of the data in memory. In this regard, one or more of the set of independent variables or one or more of the set of observations may be selected based on user input via the GUI 106.

The visual environment 104 is configured to cooperate with the EDA module 108 to perform an interactive exploratory data analysis of the values of the set of independent variables for the set of observations, in which infographics are automatically produced in the GUI 106 to visually summarize the values of the set of independent variables. Examples of suitable exploratory data analyses include univariate analysis, bivariate analysis, outlier detection, correlation analysis and the like. Examples of suitable infographics include frequency distributions (e.g., histograms, bar plots, kernel density estimation plots), descriptive statistics (e.g., box plots, flight phase levels), data quality graphics (e.g., table plots, summaries of distinct count), correlations (e.g., heat maps), time-series plots and the like.

The visual environment 104 is configured to cooperate with the feature construction and selection module 110 to perform an interactive feature selection (referred to herein at times as an interactive feature construction and selection) based on the interactive exploratory data analysis. In the interactive feature construction and selection, select independent variables from the plurality of independent variables are selected as or transformed into a set of features for use in building the ML model 118 to predict the dependent variable. The transformation may include application of one or more of the select independent variables to a transformation to produce a feature of the set of features. And in the interactive feature construction and selection, one or more of the select independent variables selected as or transformed into the set of features, or the transformation, may be based on user input via the GUI and the infographics automatically produced in the GUI. In this manner, a user such as a SME build their own features based on their domain knowledge, providing user input to dictate the select independent variable(s) and/or transformation from which a (new) feature may be produced for the set of features.

As described herein, feature construction and selection may include feature selection as well as feature construction or feature generation. Feature construction and selection may incorporate techniques such as random forest, principal component analysis (PCA), information gain, correlation coefficient scoring and the like to select independent variables as features. Feature construction may include applying various functions such as addition, subtraction, cosine, tangent, sine, log, exponential or the like to one or more select independent variables to transform them into features. Feature generation may include deriving features from select independent variables using aggregating functions such as minimum, maximum, average, standard deviation, kurtosis, skewness, variance, quantile or the like. In some examples, the feature construction and selection may include a feature construction to transform select independent variables into an independent variable, as well as a feature generation to derive a feature from the independent variable.

The visual environment 104 is configured to cooperate with the model building module 112 to build the machine learning model using a machine learning algorithm, the set of features, and a training set. In some examples, the ML model build is interactive like the exploratory data analysis, and feature construction and selection. That is, in some examples, the visual environment 104 is configured to cooperate with the model building module 112 to perform an interactive model building. In this interactive model building, the machine learning algorithm may be selected from a plurality of machine learning algorithms 120 based on user input via the GUI 106. Examples of suitable machine learning algorithms include supervised learning algorithms, semi-supervised learning algorithms, unsupervised learning algorithms, active learning algorithms and the like. More specific examples include random forest, decision trees, logistic regression, support vector machines and the like. For the module build, interactive or otherwise, the training set may be produced from the set of features and the plurality of observations of the data, including values of the select independent variables, and the value of the dependent variable.

In some examples, the iterative process further includes the visual environment 104 configured to cooperate with the model evaluation module 114 to perform a model evaluation to evaluate the ML model 118, which may be an interactive model evaluation. This may include using the model to predict and thereby produce evaluative predictions of the dependent variable, and produce in the GUI 106 at least one evaluative infographic that summarizes the evaluative predictions in a layout that reflects performance of the machine learning model. In some examples, the evaluation may involve production of an interactive confusion matrix, class error plots, receiver operating characteristic (ROC) curves and the like. And in some examples, the interactive confusion matrix in the GUI includes a control to enable user input to increase or decrease a desired model output.

As part of the model evaluation, instead of considering only numerical errors, example implementations may also account for the risk of false predictions through an interactive confusion matrix. Depending on the situation or application setting, risk appetite of end user may differ. For example, a ML model for recommending a book may be developed in a manner similar to a ML model recommending a part repair/change in an aircraft, but they may have different costs of false prediction. The visual environment 104 may therefore cooperate with the model evaluation module 114 to make an interactive control available to the user to increase or decrease the desired model output and get instant visual feedback of new outputs. This may be accomplished by an optimization algorithm for computational efficiency, or using any approach that involves searching for a predefined space to find best fits to objective. By giving the limits of acceptable values, the user may be again inputting their domain knowledge in development of the ML model 118.

The iterative process according to example implementations may include only one iteration after which the visual environment 104 is configured to output the ML model 118 for deployment to predict and thereby produce predictions of the dependent variable for additional observations of the data that exclude the value of the dependent variable. As explained above, the ML model developed by the system 100 may produce predictions that are more accurate than produced by a corresponding ML model built without the interactive exploratory data analysis and the interactive feature construction and selection that include user input via the GUI 106.

The iterative process in other examples may include one or more subsequent iterations used to adjust or refine the ML model 118, such as through modifications in one or more of the interactive exploratory data analysis, interactive feature construction and selection or model build. In some examples, a modification may be made in the interactive exploratory data analysis, which may then propagate downstream. More particularly, in at least one subsequent iteration in some examples, the visual environment 104 may be configured to cooperate with the EDA module 108 to perform the interactive exploratory data analysis in which the set of independent variables or the set of observations is modified based on user input via the GUI 106, and in which modified infographics are automatically produced in the GUI. In these examples, the visual environment is configured to cooperate with the feature construction and selection module 110 to modify one or more of the set of features to produce a modified set of features for the subsequent iteration, based on user input via the GUI and the modified infographics automatically produced in the GUI. And the visual environment 104 is configured to cooperate with the model building module 112 to build a version of the machine learning model using the machine learning algorithm, the modified set of features, and a modified training set produced from the modified set of features and the plurality of observations of the data.

Additionally or alternatively, the iterative process may include one or more subsequent iterations in which a modification is made in the interactive feature construction and selection, which may then propagate downstream. In at least one subsequent iteration in some examples, the visual environment 104 is configured to cooperate with the feature construction and selection module 110 to modify one or more of the set of features to produce a modified set of features for the subsequent iteration, based on user input via the GUI 106. In these examples, the visual environment is configured to cooperate with the model building module 112 to build a version of the machine learning model using the machine learning algorithm, the modified set of features, and a modified training set produced from the modified set of features and the plurality of observations of the data.

In some examples a feature of the set of features is produced from application of one or more of the select independent variables to a transformation. In at least one subsequent iteration in some examples, the visual environment 104 is configured to cooperate with the feature construction and selection module 110 to modify the one or more of the select independent variables or the transformation based on user input via the GUI. The feature of the set of features produced therefrom may be thereby modified, with the set of features being a modified set of features including a thereby modified feature for the subsequent iteration. In these examples, the visual environment is configured to cooperate with the model building module 112 to build a version of the machine learning model using the machine learning algorithm, the modified set of features, and a modified training set.

Even further, the iterative process may include one or more subsequent iterations in which a modification is made in the model build, or more particularly the interactive model building in some examples. In at least one subsequent iteration in some examples, then, the visual environment 104 is configured to cooperate with the model building module 112 to perform the interactive model building to build a version of the machine learning model using a different one of the plurality of machine learning algorithms 120, the set of features, and the training set. Here, the different one of the plurality of machine learning algorithms may be selected based on user input via the GUI 106.

Figure 2:
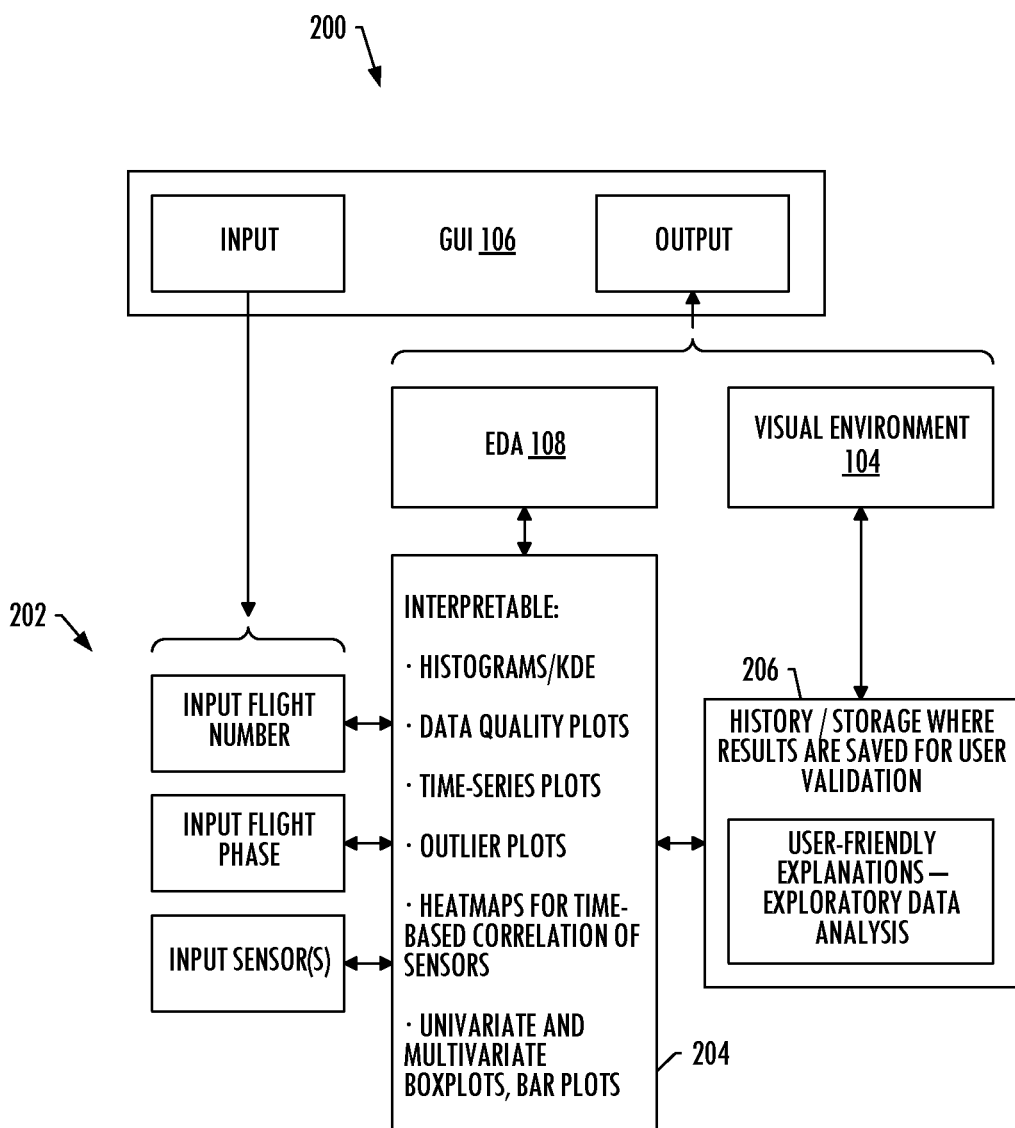
FIGS. 2, 3, 4, 5 and 6 illustrate phases of interactive development of a machine learning model, including respectively an interactive exploratory data analysis phase, interactive feature construction and selection phase, interactive machine learning model building phase, and interactive machine learning model evaluation phase, according to some example implementations.
Figure 3:
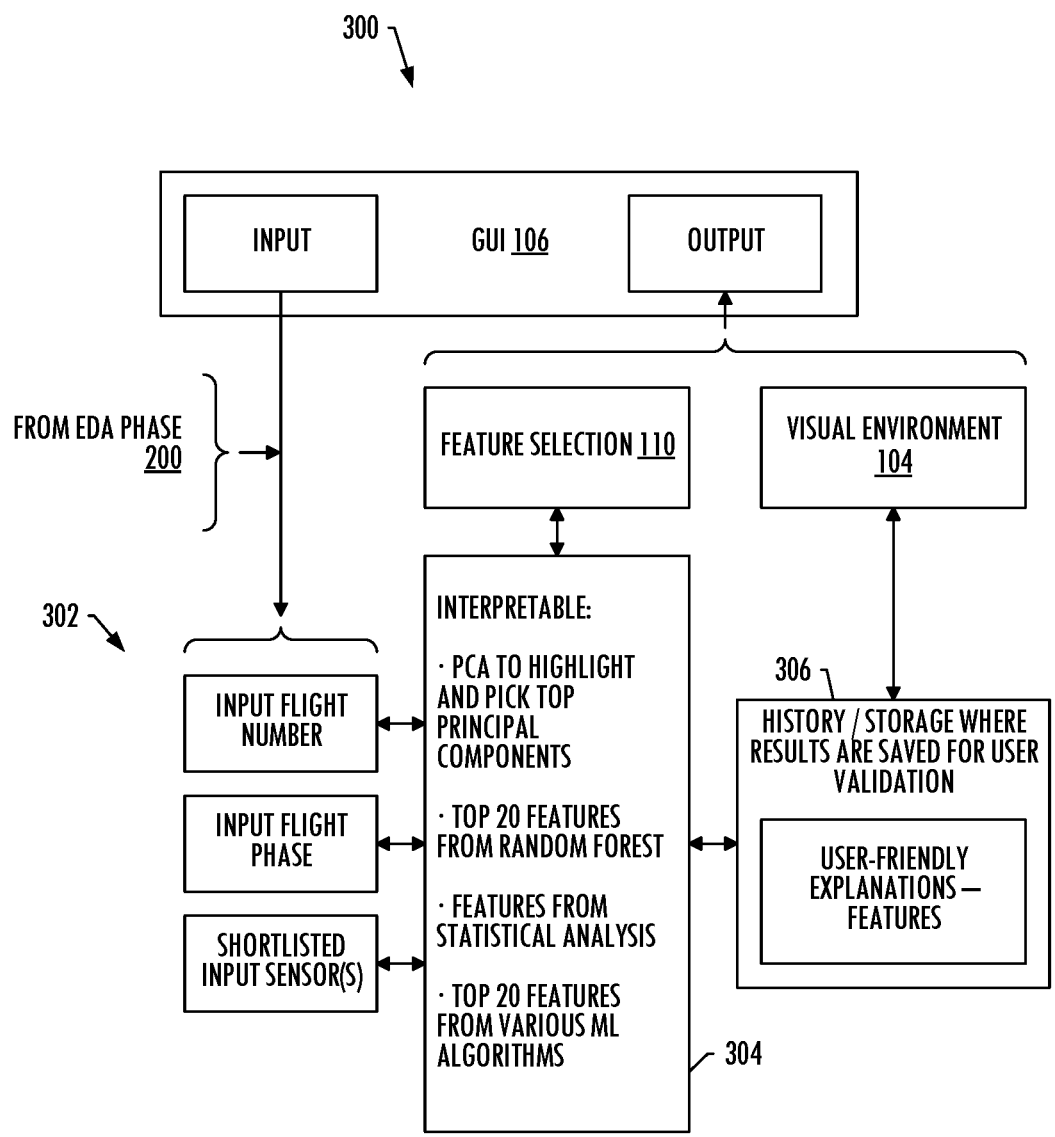
Figure 4:
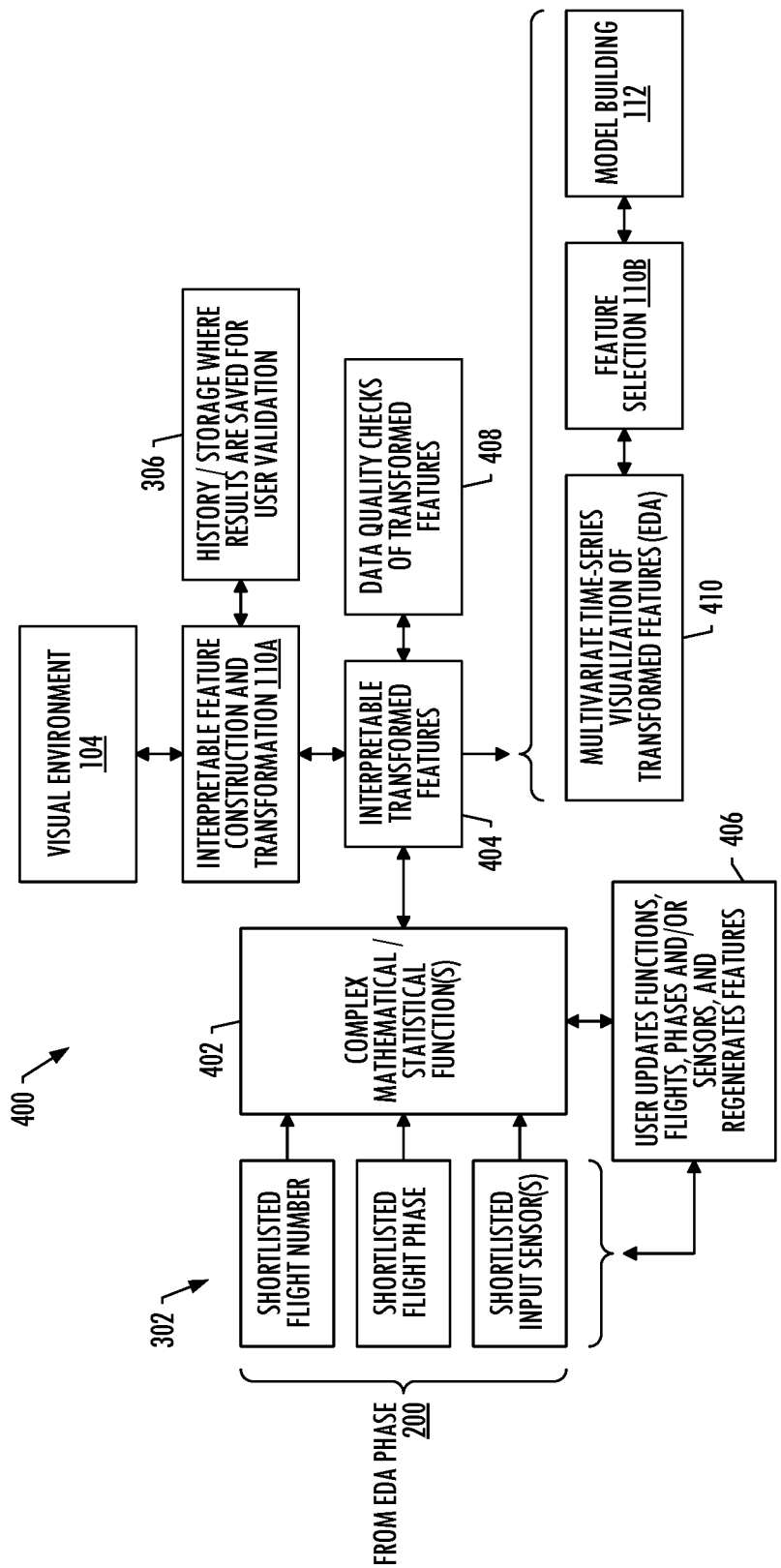
Figure 5:
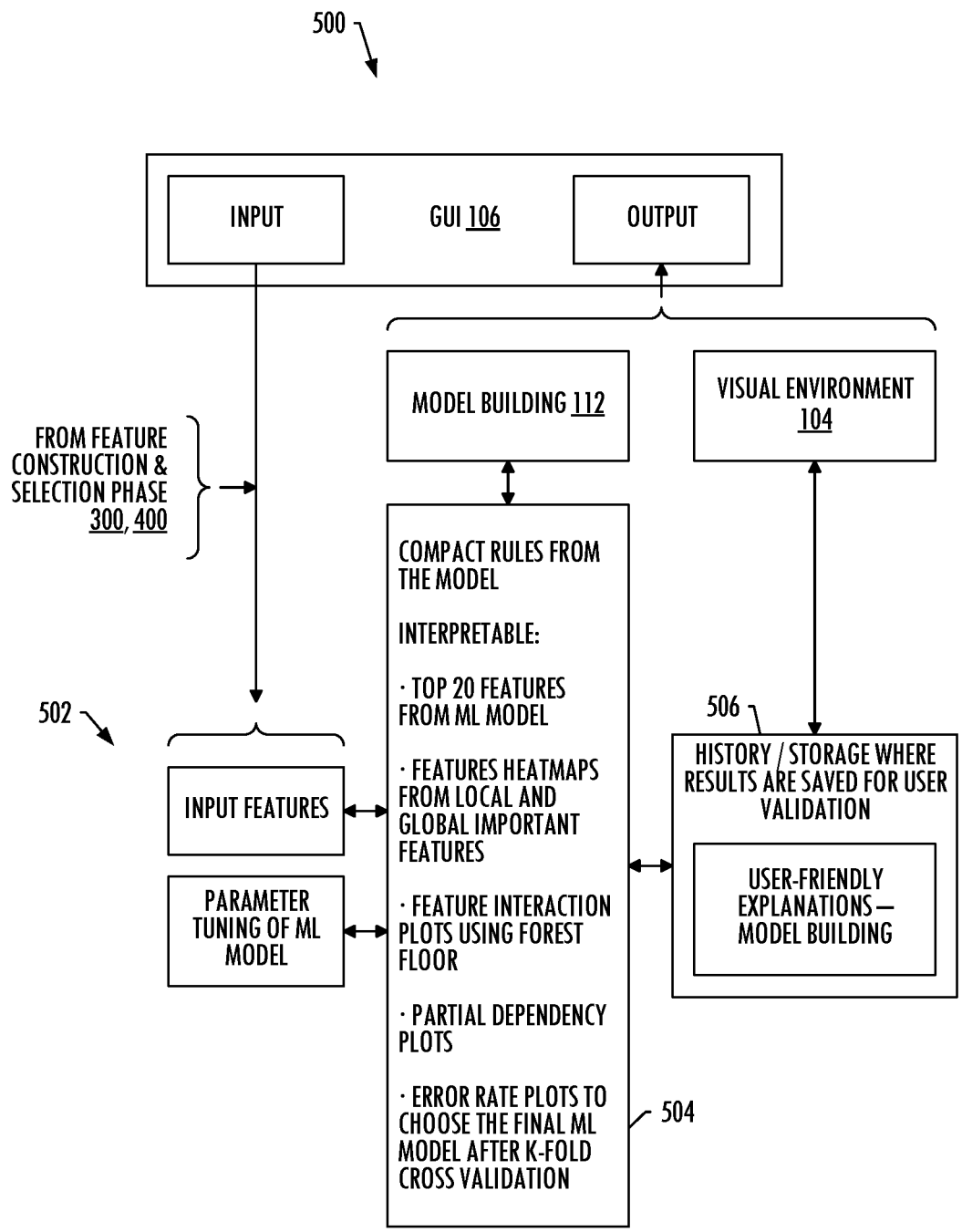
Figure 6:
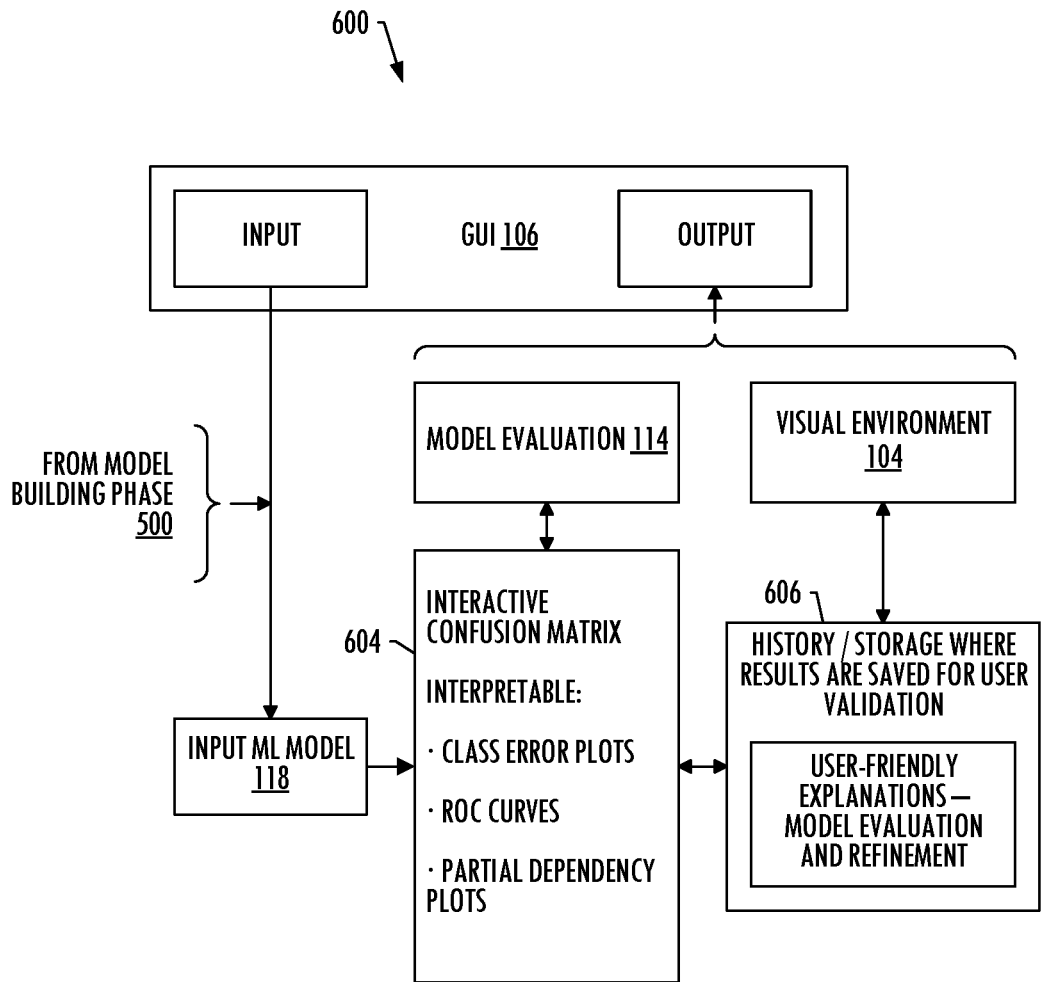

More particular example implementations of the system 100 being configured to implement the framework for interactive development of a machine learning (ML) model in the context of aircraft data will now be described with reference to FIGS. 2, 3, 4, 5 and 6, which illustrate phases of interactive development of a machine learning model. In this regard, FIG. 2 illustrates an interactive EDA phase 200, according to some example implementations. FIGS. 3 and 4 illustrate implementations of an interactive feature construction and selection phase 300, 400. And FIGS. 5 and 6 illustrate respectively an interactive model building phase 500, and interactive model evaluation phase 600, according to some example implementations.

In these example implementations, the visual environment 104 including its GUI 106, and the EDA module 108, feature construction and selection module 110, model building module 112 and model evaluation module 114, may be implemented as a software-based tool for interactive development of a ML model. According to these more particular example implementations, operation of the tool may begin with the aircraft data (observations of data) being uploaded or otherwise received into the visual environment. As explained above, this may include observations of flight data from sensors or avionic systems (generally at times simply referred to as "sensors") onboard the aircraft, recorded by an airborne flight recorder such as a QAR (the data thereby at times referred to as "QAR data"). This flight data may include independent variables that are measurements from the sensors. And the tool may enable a user such as a SME to add values of the dependent variable such as classification of the aircraft during the flights as healthy or faulty.

As shown in FIG. 2, in the interactive EDA phase 200, the tool (visual environment 104 in cooperation with the EDA module 108) is configured to perform an exploratory data analysis on time-series data of the flight data. The tool enables the user to make selections 202 of particular flights, flight phases (climb, cruise, etc.), sensors and/or measurements of their choice. In some examples, these selections may be enabled in the GUI 106 with suitable graphical user interface elements such as tabs, drop-down menus or the like.

The tool may intelligently perform missing value imputation, keeping in mind the sampling frequency at which measurements are extracted from the QAR for each flight (regardless of aircraft model). The tool may also intelligently identify continuous and categorical sensor parameters (measurements), and visualize them for user exploration and selection.

The tool provides the user with interactive and interpretable infographics or other artifacts 204 for the user's chosen flights, flight phases, etc., such as histograms, kernel density estimation (KDE) plots, data quality plots, time-series plots, heat maps for time-based correlation of sensors, univariate and multivariate boxplots, bar plots, and the like. These provide the user with useful (meaningful) insights unlike a static, non-interactive exploratory data analysis. For example, histograms and KDE plots help in understanding the distribution of continuous sensor parameters, and bar plots help in analyzing the frequency distribution of discrete sensor parameters. The user may also explore the flight parameters across various phases of the flight (cruise, climb, etc.) using the boxplots, histograms, time-series plots, bar plots and the like, which helps the user select important parameters based on their domain knowledge (helps in dynamically capturing distribution of each sensor parameter). Even further, the tool may include a comparison feature to compare two time series observations (flights that can be healthy or faulty) to obtain signature patterns for the failure of the flights across user-selected sensor parameters at each phase of the flight which are highly interactive in the way that the user can subset the time duration of the flights and visualize the cause of a fault.

In some examples, the tool includes the intelligence to perform data cleansing and imputation, and at one or more if not every step, shows the user what sensor parameters are removed and why they were removed with interactive plots called table plots for both continuous and categorical parameters. A data quality table may be provided by the tool to keep track of the sensor parameters lost during cleansing (capturing outliers in the data). And the tool may allow the user to select (e.g., via a drop down menu) at least one final sensor after exploring each and every parameter that are carried forward to the next level of analysis, unlike static, non-interactive feature selection.

As also shown, the tool may provide a history or storage 206 to store at least some if not all of the results of the interactive data analysis so that those results may be consulted or used again without repeating the entirety of the phase.

As shown in FIG. 3, in the interactive feature construction and selection phase 300 of the interactive model development, the tool (visual environment 104 in cooperation with the feature construction and selection module 110) is configured to perform a redundant and highly-correlated feature analysis on inputs 302 such as the user-selected flights, flight phases, sensors and the like. In the GUI 106, the tool may produce an interactive heat map of the sensors with their correlation coefficients and significance values. The user may here remove sensor parameters of their choice, not just by considering the coefficient values but based in the user's domain knowledge, and select only those sensors that are highly relevant to them for further analysis.

Interactive feature construction and selection according to these more particular example implementations may also include the tool being configured to perform feature engineering and transformation on the selected sensor parameters after interactive exploratory data analysis and selecting important sensor parameters. The tool may provide the user with interactive and interpretable artifacts 304 such as a PCA to highlight and pick top principal components, the top features from application of a random forest, statistical analysis and/or various machine learning algorithms 120. New features may be constructed by applying various user-selected mathematical functions (e.g., addition, subtraction, multiplication, cosine, tan, sine, log, exponential) to user-selected flight data. Additionally or alternatively, new features may be generated by aggregating flight data across each user-selected phase by application of various user-selected statistical functions such as minimum, maximum, average, standard deviation, kurtosis, skewness, variance, quantile and the like.

In some examples, the tool may perform a data quality check on new features generated or constructed from the flight data, and capture the quality of the newly generated data set in an interactive table where the user can see why few sensor parameters were not chosen for the model building and prediction. The tool may also here provide a history or storage 306 to store at least some if not all of the results of the interactive feature construction and selection so that those results may be consulted or used again without repeating the entirety of the phase.

FIG. 4 illustrates the interactive feature construction and selection phase 400 of the interactive model development, according to another implementation. This implementation is similar to the interactive feature construction and selection phase 300 of FIG. 3. As shown in FIG. 4, the visual environment cooperates with a separated feature construction and transformation module 110A and feature selection module 110B (in cooperation implementing the tool) to perform an interactive feature construction and selection. This includes inputs 302 similar to before, one or more of which may be shortlisted based on the exploratory data analysis from the interactive EDA phase 200. It also includes a history or storage 306.

As shown in FIG. 4, the tool may apply various user-selected mathematical/statistical functions 402 to user-selected flight data from user-selected flights, phases and/or sensors to construct new, transformed features 404. Throughout this phase, the user may update 406 one or more of the flights, phases or sensors, or the mathematical/statistical functions to regenerate the transformed features. As described above, the tool may perform a data quality check 408 on new features generated or constructed from the flight data, and capture the quality of the newly generated data set. The tool may further provide the user with interactive and interpretable infographics or other artifacts for the transformed features, such as a multivariate time-series visualization 410 of the transformed features from an exploratory data analysis of the transformed features. The tool may further implement the model building module 112 to provide at least some of the functionality of the interactive model building phase 500, described in greater detail below.

As shown in FIG. 5, in the interactive model building phase 500, the tool (visual environment 104 in cooperation with the model building module 112) is configured to perform an interactive model building in which the ML model 118 is built. Here, inputs 502 including the transformed features are automatically picked in the GUI 106 that allows the user to select the transformed parameters on which the user wants to interactively build the ML model. The GUI provides an intuitive and visual interface to tune parameters of the ML model by optimizing the error for convergence of the ML algorithm. The tool may provide the user with interactive and interpretable artifacts 504 that may be used tune the ML model. In a random forest algorithm, for example, the user may visualize the number of trees, out-of-bag (OOB) error rate, and then select a final ML model for prediction.

As shown in FIG. 5, in the interactive model building phase 500, the tool may also allow the user to select among and explore different machine learning algorithms 120. The user may also build and rebuild versions of the ML model by addition or deletion of the sensor parameters, such as on a single gesture (e.g., click).

The tool may also facilitate the user selecting a correct parameter while constructing a forest. A Gini index or information gain may be used as splitting criteria for building a random forest, and the tool may produce, in the GUI 106, plots that help in deciding the way the random forest should be built. The tool may show the top sensor parameters (e.g., 20 parameters) by variable importance (relative feature importance) plot using the Gini index (method used by the random forest algorithm to pick top parameters). These are the top sensor parameters that are positively contributing to the prediction of the flight as healthy or faulty (random forest algorithm build based Gini index as splitting criteria). Additionally or alternatively, the tool may show the top sensor parameters (e.g., 20 parameters) by variable importance plot using OOB error rate, which are positively contributing to the prediction of the flight as healthy and faulty (random forest algorithm build based information gain as splitting criteria).

The tool opens up the machine learning algorithm (e.g., random forest (ensemble of decisions trees)) and shows sample important trees that are significantly involved in predicting flights with their condition as healthy or faulty. The tool combines the various ways through which a random forest algorithm makes predictions and shows the important parameters contributing to the prediction using a heat map so that the user sees the similar trend or parameters that are important in prediction using different methods while constructing the forest and select a model which shows similar results across different methods for final evaluation on unseen test data.

In some examples, the tool provides, in the GUI 106, an advanced tab to perform a K-fold cross-validation of the flight data set so that parameter optimization may be automatically performed. Here, the user may interactively change the values of k (from 3 to 10). The user may also select the model based on plots of K-fold versus OOB error rate so that the user understands why specific fold results were considered based on minimum OOB error rate from the plots.

Once a (final) ML model 118 is built, after tuning and optimization, the tool enables the user to further drill down to see why that parameter was picked by machine learning algorithm by seeing separate partial dependency plots for the top parameters (e.g., 20 parameters) across healthy and faulty flights. The user may select the parameter and see how much it contributes to the prediction of a flight as healthy or faulty. The tool may also show the user another plot to open the ML model, namely, a multi-dimensional scaling plot that clusters the flights considered for the model building in appropriate clusters (healthy and faulty) as classified/predicted by the ML model. This plot may help the user to visually evaluate the model's prediction accuracy of correctly classifying a flight.

Similar to in the other phases, the tool may provide a history or storage 506 to store at least some if not all of the results of the interactive model building so that those results may be consulted or used again without repeating the entirety of the phase.

As shown in FIG. 6, in the interactive model evaluation phase 600 of interactive model development, the tool (visual environment 104 in cooperation with the model evaluation module 114) is configured to evaluate the (final) ML model 118. In some examples, once the user has saved the ML model, the user can use the tool to evaluate and, if desired through subsequent iteration(s), refine the ML model. Here, the tool may produce artifacts 604 such as an interactive confusion matrix (built on optimization logic), error rate plots, ROC curves, partial dependency plots and the like. The tool may also allow the user to re-classify flight(s) as healthy or faulty if the underlying machine learning algorithm is raising false alarms so that the user achieves greater precision, unlike traditional black box ML models.

The tool may further allow the user to select flights or data points contributing significantly to the prediction, and perform healthy versus faulty flight comparisons. Significant parameters picked by the machine learning algorithms 120 may be visualized through the GUI 106, and healthy and faulty flights may be compared side-by-side with boxplots, KDE plots, time-series plots and the like. The tool may further provide meaningful recommendations and fixes by analyzing and comparing the flights across different phases for the relevant parameters. And the tool may provide a history or storage 606 to store at least some if not all of the results of the interactive model evaluation so that those results may be consulted or used again without repeating the entirety of the phase.

Figure 7:
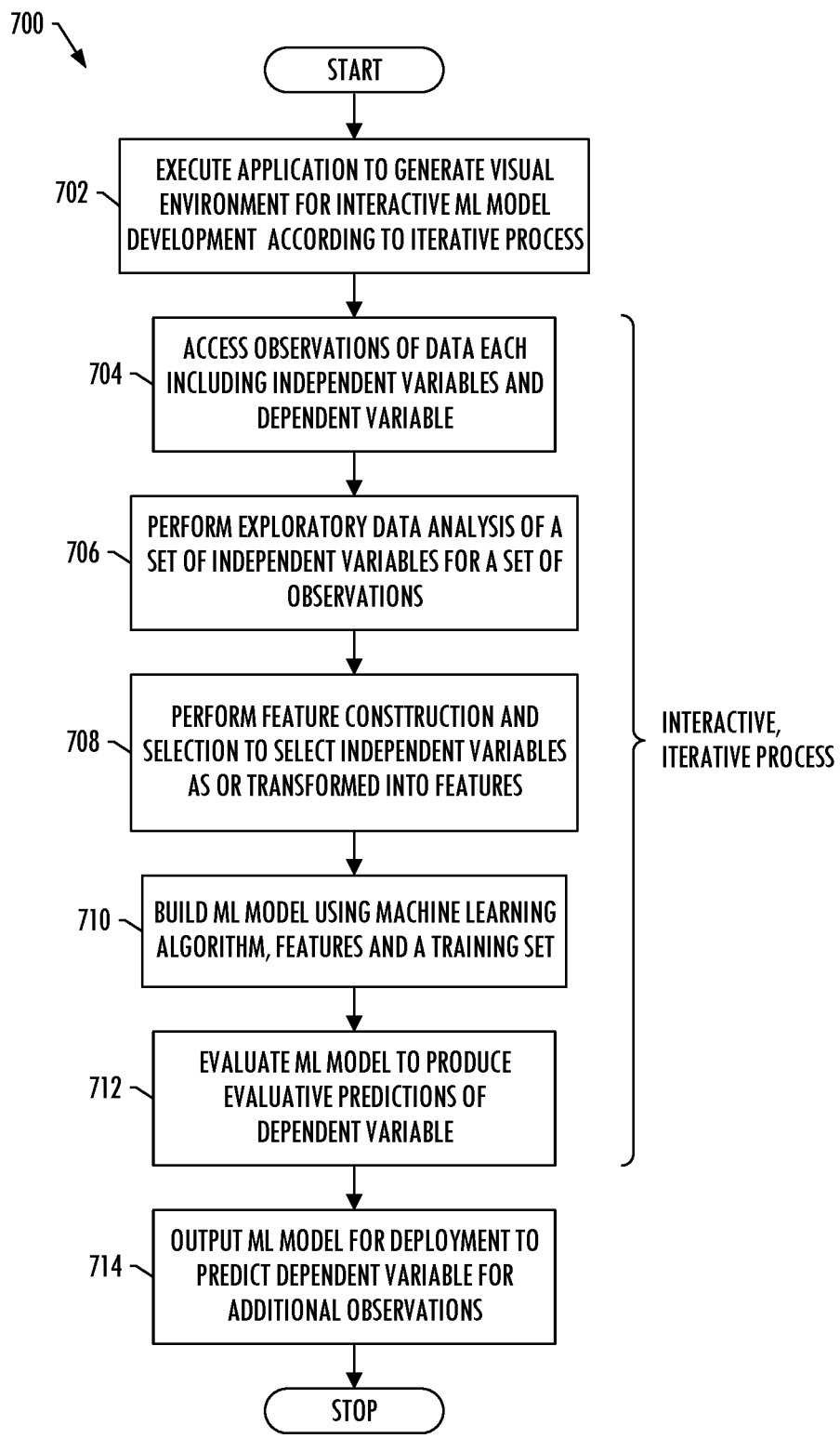
FIG. 7 is a flowchart illustrating various steps in a method of interactive machine learning model development, according to example implementations.

FIG. 7 is a flowchart illustrating various steps in a method 700 of interactive ML model development, according to example implementations of the present disclosure. As shown at block 702, the method includes executing an application, via processing circuitry, to generate a visual environment 104 including a GUI 106 for interactive development of a ML model 118, according to an iterative process. At least an iteration of the iterative process is shown at blocks 704-712. More particularly, as shown at block 704, an iteration of the iterative process includes accessing a plurality of observations of data of a system, each of the plurality of observations of the data including values of a plurality of independent variables, and a value of a dependent variable.

The iterative process includes performing an interactive exploratory data analysis of the values of a set of independent variables from the plurality of independent variables for a set of observations from the plurality of observations of the data, as shown in block 706. In the interactive exploratory data analysis, infographics are automatically produced in the GUI 106 to visually summarize the values of the set of independent variables, with one or more of the set of independent variables or one or more of the set of observations being selected based on user input via the GUI.

As shown at block 708, the iterative process includes performing an interactive feature construction and selection based on the interactive exploratory data analysis. In the interactive feature construction and selection, select independent variables from the plurality of independent variables are selected as or transformed into a set of features for use in building the ML model 118 to predict the dependent variable. In this regard, one or more of the select independent variables are selected as or transformed into the set of features based on user input via the GUI 106 and the infographics automatically produced in the GUI. And as shown at block 710, the iterative process includes building the ML model using a machine learning algorithm, the set of features, and a training set produced from the set of features and the plurality of observations of the data, including values of the select independent variables, and the value of the dependent variable.

In some examples, the method further includes evaluating the ML model 118, as shown at block 712. This may include using the ML model to predict and thereby produce evaluative predictions of the dependent variable, and producing at least one evaluative infographic that summarizes the evaluative predictions in a layout that reflects performance of the machine learning model.

Figure 8:
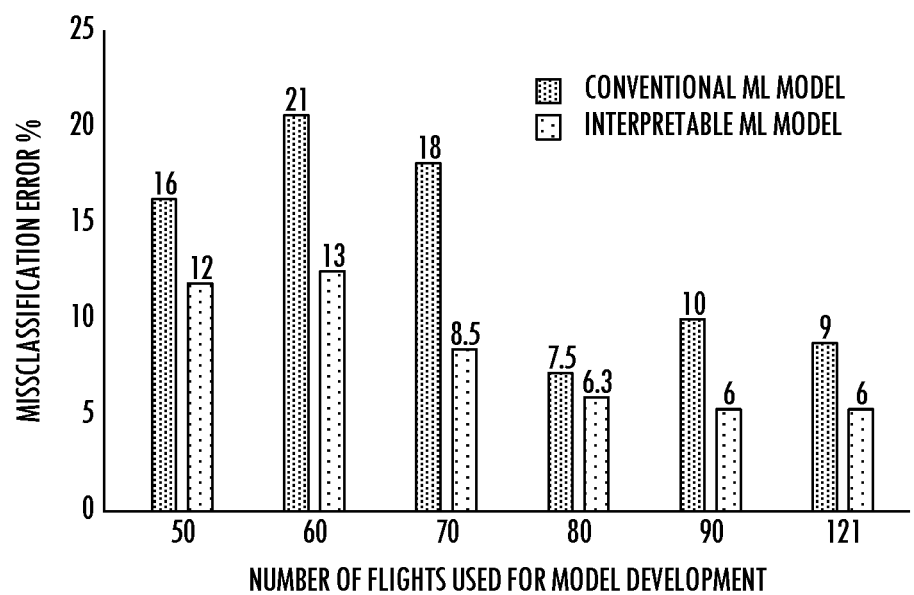
FIG. 8 is a bar chart of experimental results of building a conventional ML model versus an interpretable ML model developed according to example implementations.

The method also includes outputting the ML model 118 for deployment to predict and thereby produce predictions of the dependent variable for additional observations of the data that exclude the value of the dependent variable, as shown at block 714. And again, the predictions produced by the ML model are more accurate than produced by a corresponding ML model built without the interactive exploratory data analysis and the interactive feature construction and selection that include user input via the GUI. FIG. 8 is a bar chart of experimental results of building ML models with different concentrations of QAR data for healthy and faulty flights for a flow control valve subsystem, with the misclassification error percentage for a conventional ML model versus an interpretable ML model developed according to example implementations of the present disclosure.

There are many advantages of example implementations of the present disclosure, both in the context of classifying the condition of an aircraft and in other contexts. In some examples, the ML model is deployed in aircraft health management software as an aircraft condition monitoring system report. Flight delays and cancellations are extremely disruptive and costly for airlines. Deployment and use of ML model of example implementations may trim minutes from delays or avoid cancellations by recognizing and alerting to early signs of impending failures, and may thereby significantly contribute to an airline's bottom line. The ML model may help to predict faults in advance and provide alerts to avoid unscheduled maintenance.

According to example implementations of the present disclosure, the system 100 and its subsystems including the source 102, visual environment 104 (including GUI 106), EDA module 108, feature construction and selection module 110, model building module 112 and model evaluation module 114 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 9:
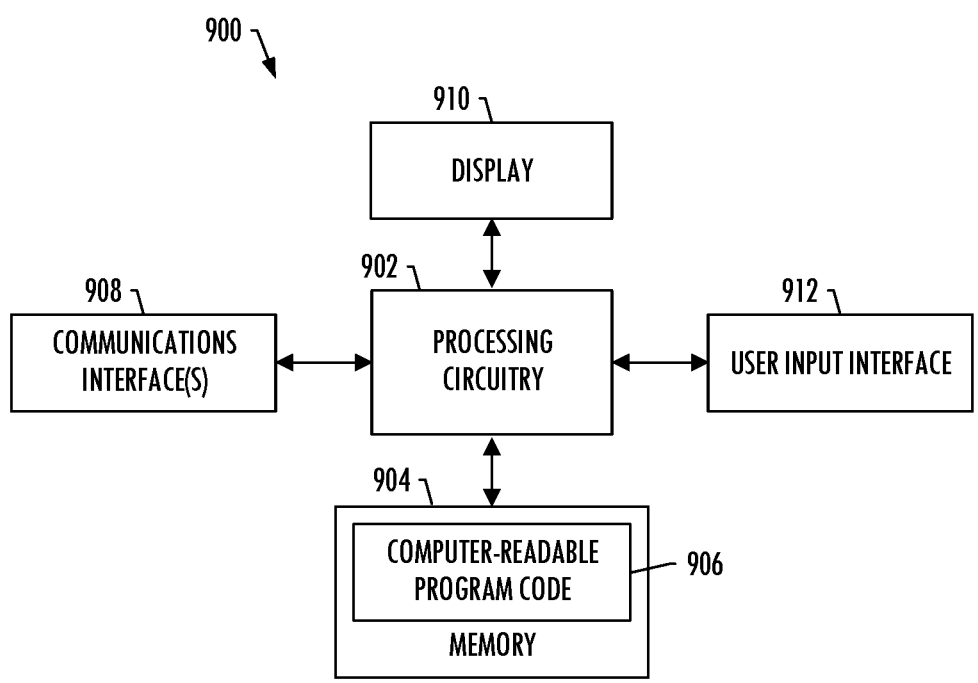
FIG. 9 illustrates an apparatus according to some example implementations.

FIG. 9 illustrates an apparatus 900 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 902 (e.g., processor unit) connected to a memory 904 (e.g., storage device).

The processing circuitry 902 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 904 (of the same or another apparatus).

The processing circuitry 902 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 904 is generally any piece of computer hardware that is capable of storing information such as, for example, data, computer programs (e.g., computer-readable program code 906) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 904, the processing circuitry 902 may also be connected to one or more interfaces for displaying, transmitting and/or receiving information. The interfaces may include a communications interface 908 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 910 and/or one or more user input interfaces 912 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 900 may include a processing circuitry 902 and a computer-readable storage medium or memory 904 coupled to the processing circuitry, where the processing circuitry is configured to execute computer-readable program code 906 stored in the memory. It will also be understood that one or more functions, and combinations of functions, may be implemented by special purpose hardware-based computer systems and/or processing circuitry s which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for interactive machine learning model development, the apparatus comprising:
   a memory storing a plurality of observations of data of a system, each of the plurality of observations of the data including values of a plurality of independent variables, and a value of a dependent variable; and
   processing circuitry configured to access the memory, and execute an application to generate a visual environment including a graphical user interface (GUI) for interactive development of a machine learning model, according to an iterative process at least an iteration of which includes the apparatus being caused to at least:
      access the memory including the plurality of observations of the data;
      build the machine learning model using a machine learning algorithm, a set of features constructed or selected from select independent variables of the plurality of independent variables, and a training set produced from the set of features and the plurality of observations of the data, including values of the select independent variables, and the value of the dependent variable; and
      perform an interactive model evaluation to evaluate the machine learning model, including using the machine learning model to predict and thereby produce evaluative predictions of the dependent variable, and produce at least one evaluative infographic in the GUI that summarizes the evaluative predictions in a layout that reflects performance of the machine learning model, the at least one evaluative infographic including an interactive confusion matrix in the GUI that includes a control to enable user input to increase or decrease a desired model output, wherein the interactive development of the machine learning model further includes the apparatus being caused to output the machine learning model for deployment to predict and thereby produce predictions of the dependent variable for additional observations of the data that exclude the value of the dependent variable, the predictions produced by the machine learning model being more accurate than produced by a corresponding machine learning model built without the interactive model evaluation that includes user input via the GUI.

2. The apparatus of claim 1, wherein the system is an aircraft, and the plurality of observations of the data is flight data for plurality of flights of the aircraft, for each flight of which the values of the plurality of independent variables are measurements of a plurality of properties recorded by an airborne flight recorder from a plurality of sensors or avionic systems during the flight, and the value of the dependent variable is an indication of a condition of the aircraft during the flight.

3. The apparatus of claim 1, wherein the iteration of the iterative process further includes the apparatus being caused to:

perform an interactive exploratory data analysis of the values of a set of independent variables from the plurality of independent variables for a set of observations from the plurality of observations of the data, in which infographics are automatically produced in the GUI to visually summarize the values of the set of independent variables, one or more of the set of independent variables or one or more of the set of observations being selected based on user input via the GUI, and wherein the apparatus being caused to build the machine learning model includes being caused to build the machine learning model using the set of features constructed or selected based on the interactive exploratory data analysis.

4. The apparatus of claim 3, wherein at least one subsequent iteration of the iterative process includes the apparatus being caused to at least:

perform the interactive exploratory data analysis in which the set of independent variables or the set of observations is modified based on user input via the GUI, and in which modified infographics are automatically produced in the GUI; and build a version of the machine learning model using the machine learning algorithm, a modified set of features based on the modified infographics automatically produced in the GUI, and a modified training set produced from the modified set of features and the plurality of observations of the data.

5. The apparatus of claim 1, wherein the iteration of the iterative process further includes the apparatus being caused to:

perform an interactive feature construction and selection in which the select independent variables from the plurality of independent variables are selected as or transformed into the set of features for use in building the machine learning model to predict the dependent variable, one or more of the select independent variables being selected as or transformed into the set of features based on user input via the GUI and the infographics automatically produced in the GUI.

6. The apparatus of claim 5, wherein at least one subsequent iteration of the iterative process includes the apparatus being caused to at least:

modify one or more of the set of features to produce a modified set of features for the subsequent iteration, based on user input via the GUI; and build a version of the machine learning model using the machine learning algorithm, the modified set of features, and a modified training set produced from the modified set of features and the plurality of observations of the data.

7. The apparatus of claim 5, wherein the apparatus being caused to perform the interactive feature construction and selection includes being caused to apply the one or more of the select independent variables to a transformation to produce a feature of the set of features, the one or more of the select independent variables or the transformation being selected based on user input via the GUI.

8. The apparatus of claim 7, wherein at least one subsequent iteration of the iterative process includes the apparatus being caused to at least:

modify the one or more of the select independent variables or the transformation based on user input via the GUI, and thereby modifying the feature of the set of features produced therefrom, the set of features being a modified set of features including a thereby modified feature for the subsequent iteration; and build a version of the machine learning model using the machine learning algorithm, the modified set of features, and a modified training set.

9. The apparatus of claim 1, wherein the apparatus being caused to build the machine learning model includes being caused to perform an interactive model building in which the machine learning algorithm is selected from a plurality of machine learning algorithms based on user input via the GUI, and wherein at least one subsequent iteration of the iterative process includes the apparatus being caused to at least:

perform the interactive model building to build a version of the machine learning model using a different one of the plurality of machine learning algorithms, the set of features, and the training set, the different one of the plurality of machine learning algorithms being selected based on user input via the GUI.

10. A method of interactive machine learning model development, the method comprising:

executing an application, via processing circuitry, to generate a visual environment including a graphical user interface (GUI) for interactive development of a machine learning model, according to an iterative process at least an iteration of which includes at least:

accessing a plurality of observations of data of a system, each of the plurality of observations of the data including values of a plurality of independent variables, and a value of a dependent variable;

building the machine learning model using a machine learning algorithm, a set of features constructed or selected from select independent variables of the plurality of independent variables, and a training set produced from the set of features and the plurality of observations of the data, including values of the select independent variables, and the value of the dependent variable; and performing an interactive model evaluation to evaluate the machine learning model, including using the machine learning model to predict and thereby produce evaluative predictions of the dependent variable, and produce at least one evaluative infographic in the GUI that summarizes the evaluative predictions in a layout that reflects performance of the machine learning model, the at least one evaluative infographic including an interactive confusion matrix in the GUI that includes a control to enable user input to increase or decrease a desired model output; and outputting the machine learning model for deployment to predict and thereby produce predictions of the dependent variable for additional observations of the data that exclude the value of the dependent variable, the predictions produced by the machine learning model being more accurate than produced by a corresponding machine learning model built without the interactive model evaluation that includes user input via the GUI.

11. The method of claim 10, wherein the system is an aircraft, and the plurality of observations of the data is flight data for plurality of flights of the aircraft, for each flight of which the values of the plurality of independent variables are measurements of a plurality of properties recorded by an airborne flight recorder from a plurality of sensors or avionic systems during the flight, and the value of the dependent variable is an indication of a condition of the aircraft during the flight.

12. The method of claim 10, wherein the iteration of the iterative process further includes:
performing an interactive exploratory data analysis of the values of a set of independent variables from the plurality of independent variables for a set of observations from the plurality of observations of the data, in which infographics are automatically produced in the GUI to visually summarize the values of the set of independent variables, one or more of the set of independent variables or one or more of the set of observations being selected based on user input via the GUI, and wherein building the machine learning model includes building the machine learning model using the set of features constructed or selected based on the interactive exploratory data analysis.

13. The method of claim 12, wherein at least one subsequent iteration of the iterative process includes at least:
performing the interactive exploratory data analysis in which the set of independent variables or the set of observations is modified based on user input via the GUI, and in which modified infographics are automatically produced in the GUI; and
building a version of the machine learning model using the machine learning algorithm, a modified set of features based on the modified infographics automatically produced in the GUI, and a modified training set produced from the modified set of features and the plurality of observations of the data.

14. The method of claim 10, wherein the iteration of the iterative process further includes:
performing an interactive feature construction and selection in which the select independent variables from the plurality of independent variables are selected as or transformed into the set of features for use in building the machine learning model to predict the dependent variable, one or more of the select independent variables being selected as or transformed into the set of features based on user input via the GUI and the infographics automatically produced in the GUI.

15. The method of claim 14, wherein at least one subsequent iteration of the iterative process includes at least:
modifying one or more of the set of features to produce a modified set of features for the subsequent iteration, based on user input via the GUI; and
building a version of the machine learning model using the machine learning algorithm, the modified set of features, and a modified training set produced from the modified set of features and the plurality of observations of the data.

16. The method of claim 14, wherein performing the interactive feature construction and selection includes applying the one or more of the select independent variables to a transformation to produce a feature of the set of features, the one or more of the select independent variables or the transformation being selected based on user input via the GUI.

17. The method of claim 16, wherein at least one subsequent iteration of the iterative process includes at least:
modifying the one or more of the select independent variables or the transformation based on user input via the GUI, and thereby modifying the feature of the set of features produced therefrom, the set of features being a modified set of features including a thereby modified feature for the subsequent iteration; and
building a version of the machine learning model using the machine learning algorithm, the modified set of features, and a modified training set.

18. The method of claim 10, wherein building the machine learning model includes performing an interactive model building in which the machine learning algorithm is selected from a plurality of machine learning algorithms based on user input via the GUI, and wherein at least one subsequent iteration of the iterative process includes at least:
performing the interactive model building to build a version of the machine learning model using a different one of the plurality of machine learning algorithms, the set of features, and the training set, the different one of the plurality of machine learning algorithms being selected based on user input via the GUI.

19. A non-transitory computer-readable storage medium for interactive machine learning model development, the computer-readable storage medium having computer-readable program code stored therein that in response to execution by processing circuitry, causes an apparatus to at least:
generate a visual environment including a graphical user interface (GUI) for interactive development of a machine learning model, according to an iterative process at least an iteration of which includes the apparatus being caused to at least:
access a plurality of observations of data of a system, each of the plurality of observations of the data including values of a plurality of independent variables, and a value of a dependent variable;
build the machine learning model using a machine learning algorithm, a set of features constructed or selected from select independent variables of the plurality of independent variables, and a training set produced from the set of features and the plurality of observations of the data, including values of the select independent variables, and the value of the dependent variable; and
perform a model evaluation to evaluate the machine learning model, including using the machine learning model to predict and thereby produce evaluative predictions of the dependent variable, and produce at least one evaluative infographic in the GUI that summarizes the evaluative predictions in a layout that reflects performance of the machine learning model, wherein at least the model evaluation is interactive and based on user input via the GUI, the at least one evaluative infographic including an interactive confusion matrix in the GUI that includes a control to enable user input to increase or decrease a desired model output, and wherein the interactive development of the machine learning model further includes the apparatus being caused to output the machine learning model for deployment to predict the dependent variable for additional observations of the data that exclude the value of the dependent variable, predictions produced by the machine learning model being more accurate than produced by a corresponding machine learning model built without the user input via the GUI.

20. The non-transitory computer-readable storage medium of claim 19, wherein the system is an aircraft, and the plurality of observations of the data is flight data for plurality of flights of the aircraft, for each flight of which the values of the plurality of independent variables are measurements of a plurality of properties recorded by an airborne flight recorder from a plurality of sensors or avionic systems during the flight, and the value of the dependent variable is an indication of a condition of the aircraft during the flight.

21. The non-transitory computer-readable storage medium of claim 19, wherein the iteration of the iterative process further includes the apparatus being caused to:

perform an interactive exploratory data analysis in which infographics are automatically produced in the GUI to visually summarize the values of a set of observations for a set of independent variables, one or more of the set of independent variables or one or more of the set of observations being selected based on user input via the GUI, and wherein the apparatus being caused to build the machine learning model includes being caused to build the machine learning model using the set of features constructed or selected based on the interactive exploratory data analysis.

22. The non-transitory computer-readable storage medium of claim 21, wherein the exploratory data analysis is an interactive exploratory data analysis, and at least one subsequent iteration of the iterative process includes the apparatus being caused to at least:

perform the interactive exploratory data analysis in which the set of independent variables or the set of observations for the set of independent variables is modified based on user input via the GUI, and in which modified infographics are automatically produced in the GUI; and build a version of the machine learning model using the machine learning algorithm, a modified set of features based on the modified infographics automatically produced in the GUI, and a modified training set produced from the modified set of features and the plurality of observations of the data.

23. The non-transitory computer-readable storage medium of claim 19, wherein the iteration of the iterative process further includes the apparatus being caused to:

perform a feature construction and selection in which the select independent variables are selected as or transformed into the set of features.

24. The non-transitory computer-readable storage medium of claim 23, wherein the feature construction and selection is an interactive feature construction and selection, and at least one subsequent iteration of the iterative process includes the apparatus being caused to at least:

modify one or more of the set of features to produce a modified set of features for the subsequent iteration, based on user input via the GUI; and build a version of the machine learning model using the machine learning algorithm, the modified set of features, and a modified training set produced from the modified set of features and the plurality of observations of the data.

25. The non-transitory computer-readable storage medium of claim 23, wherein the feature construction and selection is an interactive feature construction and selection, and the apparatus being caused to perform the feature construction and selection includes being caused to apply the one or more of the select independent variables to a transformation to produce a feature of the set of features, the one or more of the select independent variables or the transformation being selected based on user input via the GUI.

26. The non-transitory computer-readable storage medium of claim 25, wherein the feature construction and selection is an interactive feature construction and selection, and at least one subsequent iteration of the iterative process includes the apparatus being caused to at least:

modify the one or more of the select independent variables or the transformation based on user input via the GUI, and thereby modifying the feature of the set of features produced therefrom, the set of features being a modified set of features including a thereby modified feature for the subsequent iteration; and build a version of the machine learning model using the machine learning algorithm, the modified set of features, and a modified training set.

27. The non-transitory computer-readable storage medium of claim 19, wherein the apparatus being caused to build the machine learning model includes being caused to perform an interactive model building in which the machine learning algorithm is selected from a plurality of machine learning algorithms based on user input via the GUI, and wherein at least one subsequent iteration of the iterative process includes the apparatus being caused to at least:

perform the interactive model building to build a version of the machine learning model using a different one of the plurality of machine learning algorithms, the set of features, and the training set, the different one of the plurality of machine learning algorithms being selected based on user input via the GUI.

* * * * *